United States Patent  [11] 3,582,602

| [72] | Inventors | Donald H. Ettinger<br>Royal Oak;<br>Engelbert A. Meyer, Union Lake,<br>both of Mich. |
|---|---|---|
| [21] | Appl. No. | 485,007 |
| [22] | Filed | Sept. 3, 1965 |
| [45] | Patented | June 1, 1971 |
| [73] | Assignee | Warren Fastener Corporation<br>Detroit, Mich.<br>Continuation-in-part of application Ser. No. 378,507, June 29, 1964, Continuation-in-part of application Ser. No. 451,958, Apr. 29, 1965. |

[54] STUD WELDING SYSTEM
6 Claims, 21 Drawing Figs.
[52] U.S. Cl. .................................................. 219/98
[51] Int. Cl. .................................................. B23k 9/20
[50] Field of Search ........................................ 219/78, 79, 98, 99

[56] References Cited
UNITED STATES PATENTS
2,537,989  1/1951  Graham ........................ 219/78
2,905,803  9/1959  Brady ........................... 219/79
2,962,578  11/1960  DeLa Rosa ................... 219/98

Primary Examiner—R. F. Staubly
Attorney—Burton and Parker

CLAIM: An automatic, portable-gun system for repetitively welding relatively small components to panel surfaces, comprising, in combination: storage means for containing a supply of components to be welded; pneumatic feeding means for receiving components from the storage means and propelling one component at a time to the gun; a portable welding gun operable remote from and manipulatable to various welding positions independently of said storage means and said feeding means and having collet means for positioning and holding a component in welding position; a flexible elongate pneumatic delivery conduit connected at its opposite ends to said feeding means and said welding gun for delivering components therebetween; means on the gun communicating with said delivery conduit for receiving and transferring each component delivered to the gun into said welding position in the collet; a source of welding current connected to the gun; and control means connected to said feeding means and to said source of welding current and including a part on the gun operable to initiate automatic cycling operation of the system to cause welding of a component in the collet to a panel surface and delivery of the next component to the collet preparatory to the next welding cycle.

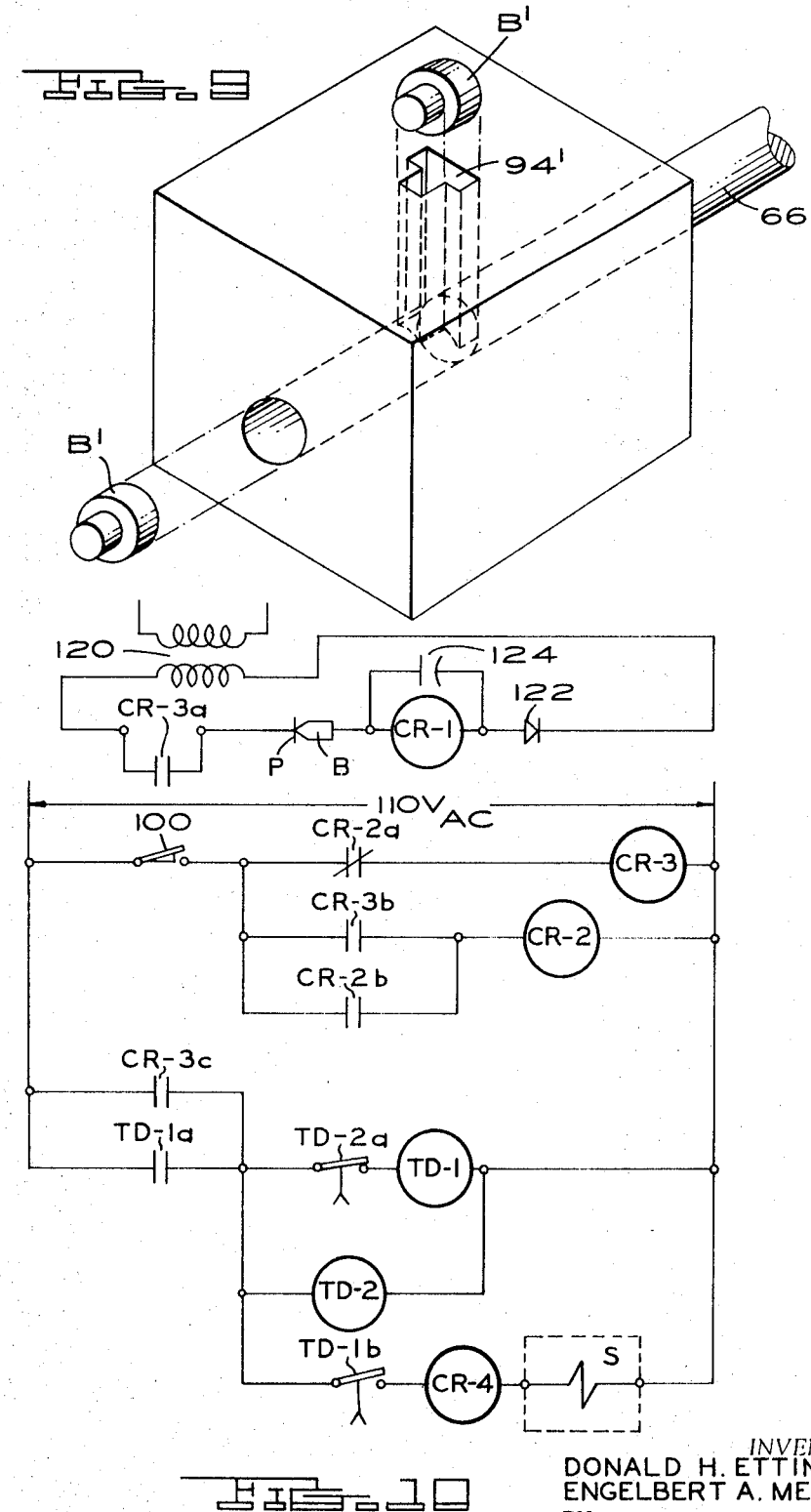

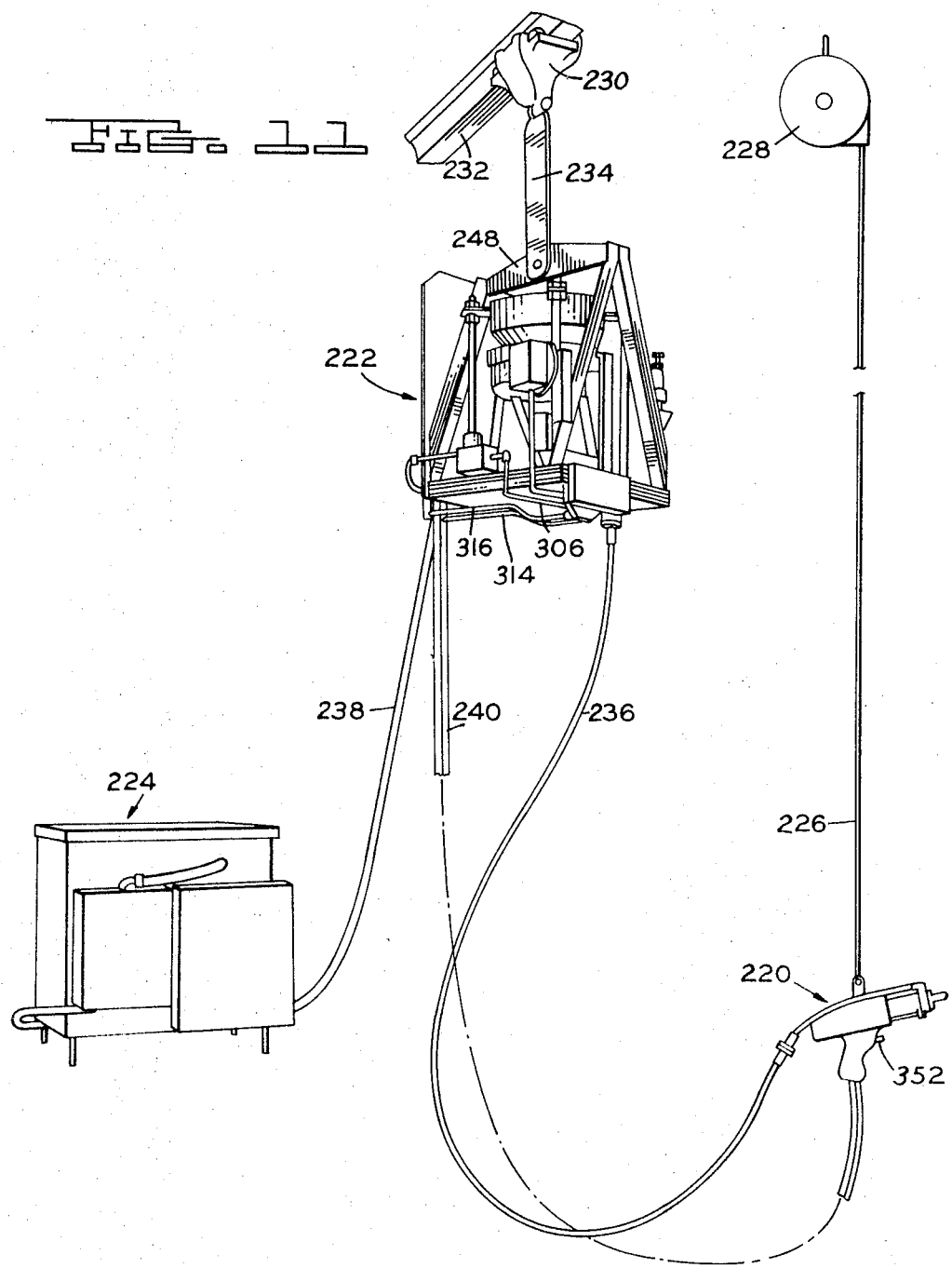

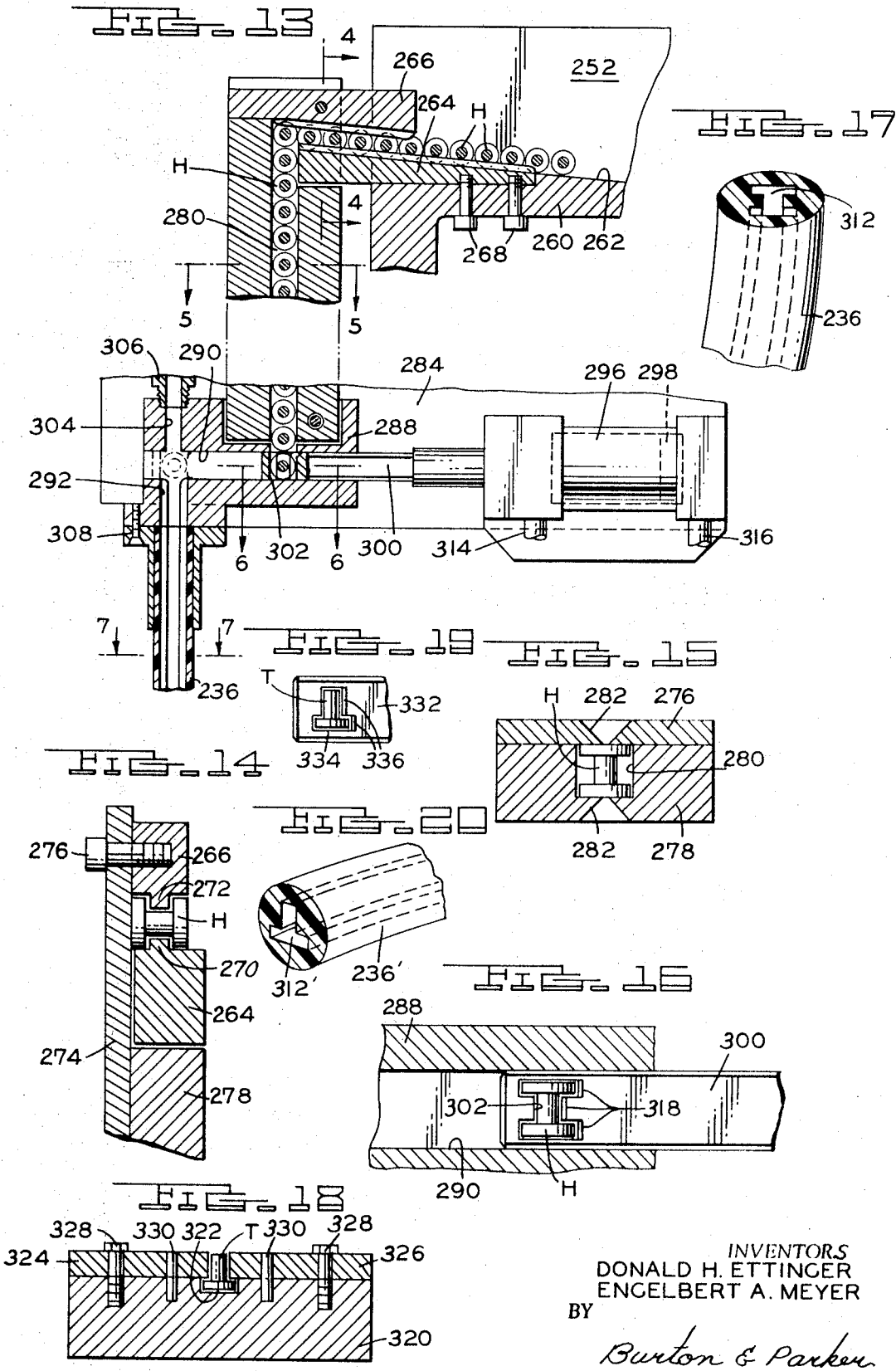

STUD WELDING SYSTEM

This application is a consolidation of our prior copending applications, Ser. No. 378,507 filed June 29, 1964 and Ser. No. 451,958 filed Apr. 29, 1965, and is a continuation-in-part of each.

This invention relates to welding apparatus, and particularly to a welding gun for affixing buttons to panels, and to an automated system for automatically accomplishing such welding.

While not restricted solely thereto, the invention disclosed herein is specifically concerned with welding relatively small headed buttons to the metal surfaces of automobile bodies. The buttons are utilized, along with a cooperating female fastener element, to secure decorative trim strips and the like to the body panels. There are many places on an automobile body where this manner of fastening may be advantageously used, for both interior and exterior trim.

Throughout the automobile industry, it has been the almost universal practice to secure items such as trim strips to the body panels by a fastener which has a portion projecting through an aperture or hole in the panel. The problems of rust and corrosion around the holes are well known, and have been a source of concern in the industry for many years. When the fastener is welded to the body panel, holes are unnecessary, and the problems of rust and corrosion are effectively eliminated.

Fastener elements of widely varying forms have been used by industry over the years, and up until very recently the securement of the fastener to a panel has been accomplished by drilling or otherwise forming an aperture in the panel through which a portion of the fastener element projects. For example, in the automotive industry, decorative trim strips have been secured to automobile body panels such as doors, fenders and the like by fasteners each having a portion which projects through a hole pierced in the body panel.

The principal disadvantage of having to provide a series of holes in the panel to accommodate the fasteners is the practical impossibility of achieving an adequate seal between the fastener and panel, and therefore the problem of leaks is ever present. Further, particularly in the case of automobile bodies, the unpainted, unprotected edges of the holes provide an excellent starting place for rust and corrosion. These problems, as well as many others, are eliminated by welding the fastener elements onto the panels. Aside from the advantages enumerated, it has been found that in many instances appreciable cost savings, both in time and materials, likewise result from the utilization of this novel concept.

Of vital concern in industries such as the automotive where production line assembly methods are employed is the speed at which the various operations must be carried out. In order to weld the fastening elements to the panels in rapid succession, some type of automatic system is needed. It is therefore the general object of the invention to provide an automatic system for welding studs, particularly fastener elements, to metal panels in rapid succession.

Another object is the provision of a welding system including a storage facility for the elements to be welded and a welding gun, wherein a feed mechanism is provided to feed successive elements from the storage facility to the welding gun, the feed mechanism being responsive to the completion of one welding operation to deliver the next element to the welding gun automatically.

Another object is to provide a system of the above character wherein the storage facility includes a vibratory hopper and the feed mechanism comprises a transfer device operably coupled to the hopper and adapted to properly orient a fastener element and retain it in proper orientation throughout its movement from the hopper to the welding gun. A concomitant object is the provision of a flexible conduit through which the element is delivered from the transfer device to the welding gun, which conduit is interiorly shaped corresponding to the shape of the elements to be fed therethrough, whereby the elements are retained oriented within the conduit and delivered to the welding gun in proper position.

Another advantage which is not so obvious, but of equal importance is the saving of storage space resulting from the use of fasteners welded to the body panels. In the case of door panels for example, the same door panel is commonly used for all models of a particular make of car, the only difference being in the decorative trim strips of stainless steel or the like attached to the panel. With holes punched in the door panels, the manufacturer is required to maintain a supply of panels with holes for each and every different trim strip configuration. By using fastener elements which are welded to the door panels, a material reduction in inventory is achieved, and the saving in requirements for storage space alone is fantastic.

Modern automobile assembly procedures require that each operation be performed with maximum speed and with minimum chance of malfunction. Equipment must be reliable and foolproof, and must be capable of functioning over extended periods without maintenance or repair.

It is therefore a general object of the present invention to provide a welding gun for welding buttons to panels which is of rugged and simple construction, and which is capable of continuous use over extended periods. The gun herein disclosed is reliable and substantially foolproof, and may be operated efficiently and rapidly by even the unskilled worker.

Another object is to provide a welding gun of the above character including means on the gun responsive to the proper positioning of the gun against a panel when a button is correctly oriented in the gun, to automatically deliver welding current to the gun electrode without the necessity of any action on the part of the operator except pushing the gun against the panel at the place where the button is to be welded thereto. A concomitant object is the provision in the gun of safety means positively preventing delivery of welding current to the gun unless a button is in the exact proper position to be welded on the panel.

A further object is the provision of a welding gun of the character described having a tubular electrode member having button-holding means at its projecting and through which member buttons are delivered to the holding means for retention during welding, and means operable automatically upon the expiration of one welding cycle to deliver another button through the electrode to the holding means ready for welding.

Another object is the provision in such a welding gun, of control means operable to prevent initiation of a second welding cycle in the absence of retraction of the gun away from the panel after a button has been welded thereto.

While the term welding "gun" has been used throughout the specification, it is to be understood that such is not intended to be restricted to a construction embodying a barrel, pistol grip handle, etc. Rather it is intended in a broad sense to include shapes other than the commonly known pistol configuration.

Other objects, advantages and meritorious features will more fully appear from the following specification, claims and accompanying drawings, wherein:

FIG. 6 is a horizontal cross section taken through the forward end portion of the gun;

FIGS. 7 and 8 are enlarged perspective views of the guide members through which buttons are delivered to the gun electrode;

FIG. 9 is an enlarged perspective schematic showing the relationship among the gun electrode rod, the button-delivery passages in the gun, and a button being delivered;

FIG. 10 is a schematic wiring diagram of the electrical control circuit for the gun;

FIG. 11 is a perspective view of a welding system embodying the invention;

FIG. 13 is a partial vertical sectional view of the feed mechanism of FIGS. 11 and 12 showing in detail the stud orienting device and the mechanism for feeding the studs successively to the welding gun:

FIG. 14 is a cross-sectional view taken along line 4-4 of FIG. 13 showing an H-shaped stud oriented in proper position for delivery to the feeding mechanism;

FIG. 15 is a cross-sectional view taken along line 5-5 of FIG. 13 showing the H-shaped stud in its travel to the feeding mechanism;

FIG. 16 is a cross-sectional view taken along line 6-6 of FIG. 13 showing the H-shaped stud oriented in the transfer plunger;

FIG. 17 is a cross-sectional view of the delivery tube for H-shaped studs taken along line 7-7 of FIG. 13;

FIGS. 18, 19 and 20 are cross-sectional views corresponding to FIGS. 15, 16 and 17 respectively showing the structure adapted for feeding T-shaped studs.

Figure 1:
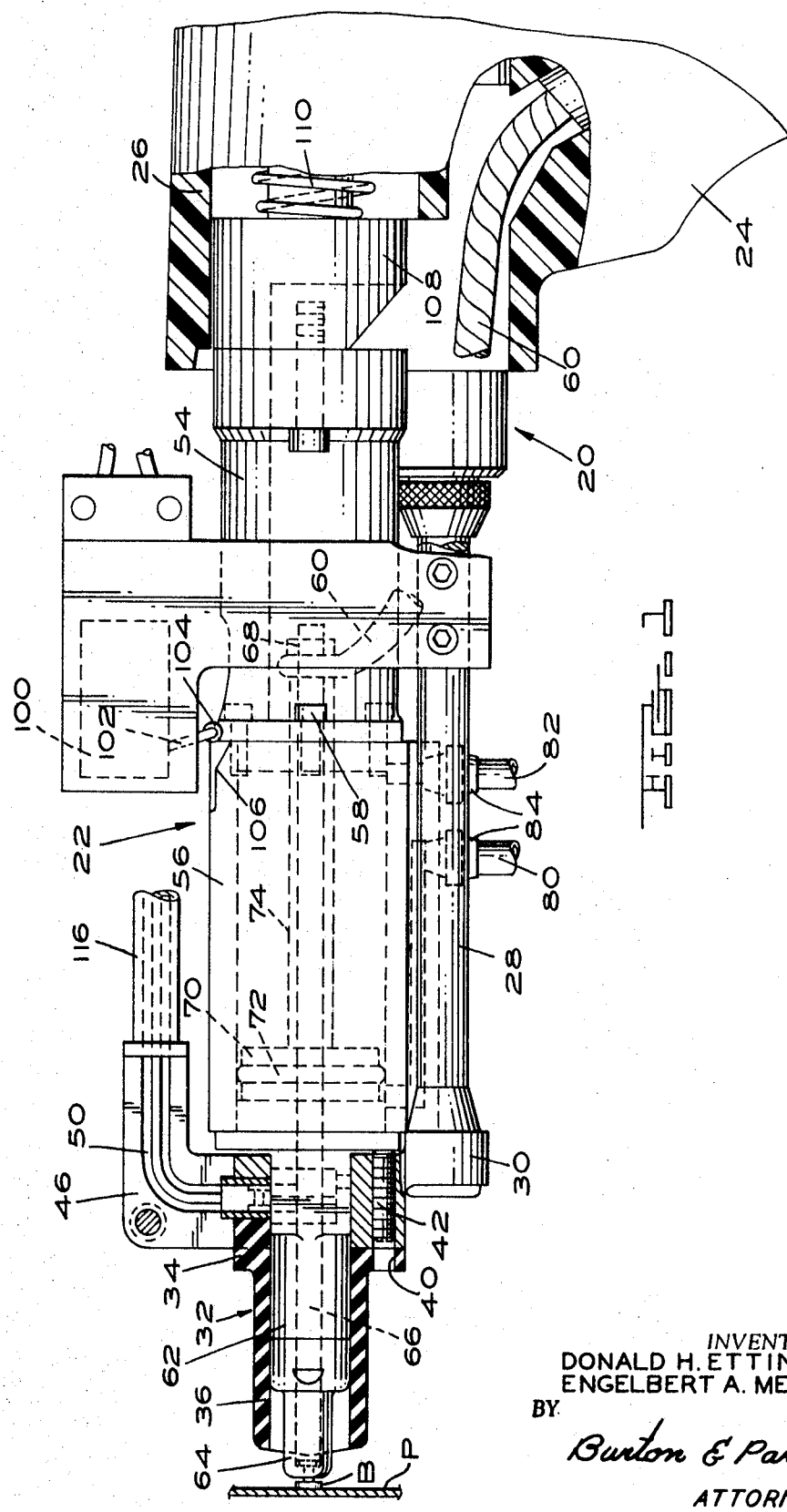
FIG. 1 is a side elevation, partially in section to show details, of a welding gun embodying the invention.
Figure 2:
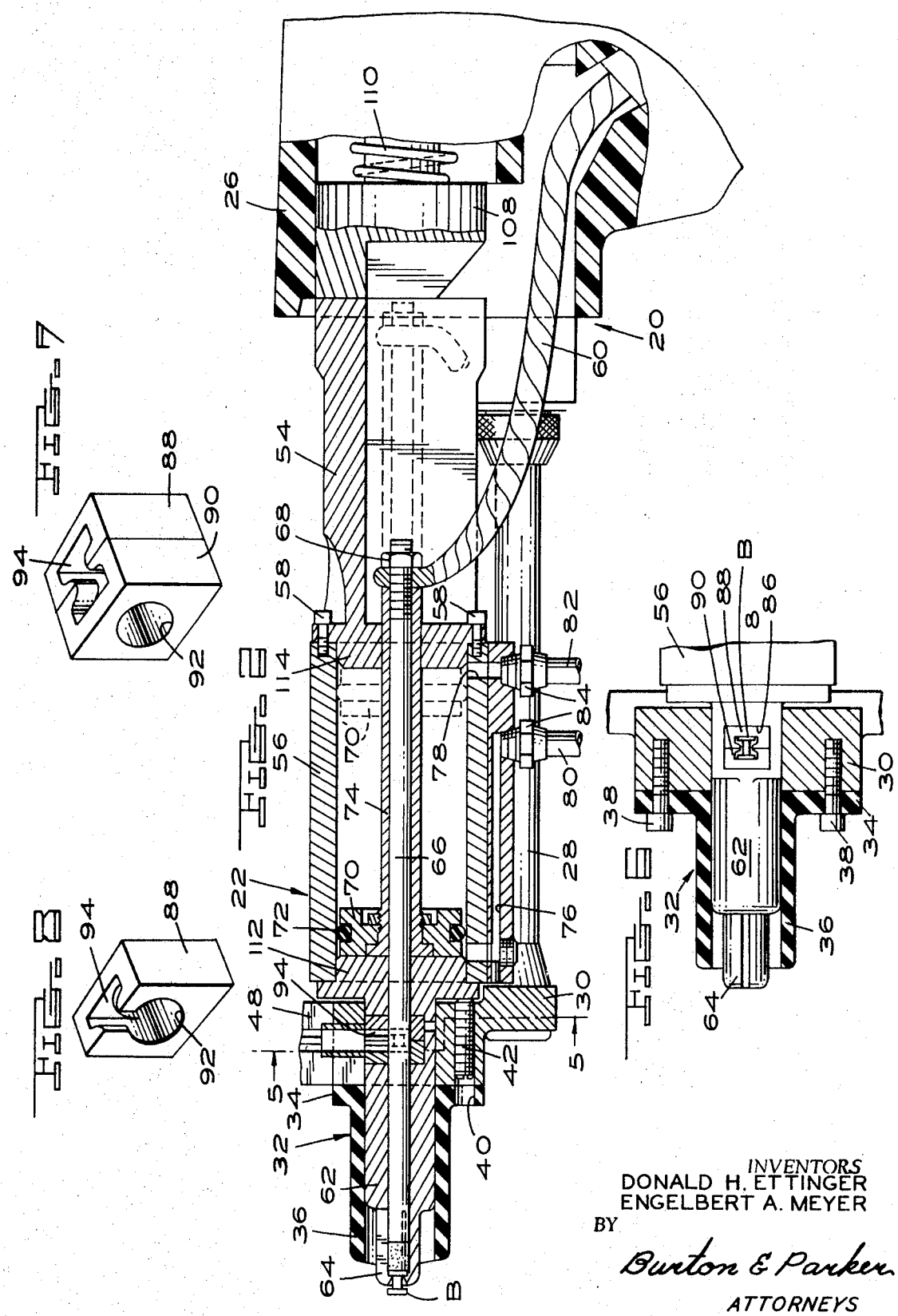
FIG. 2 is a longitudinal cross section of the gun shown in FIG. 1.
Figure 3:
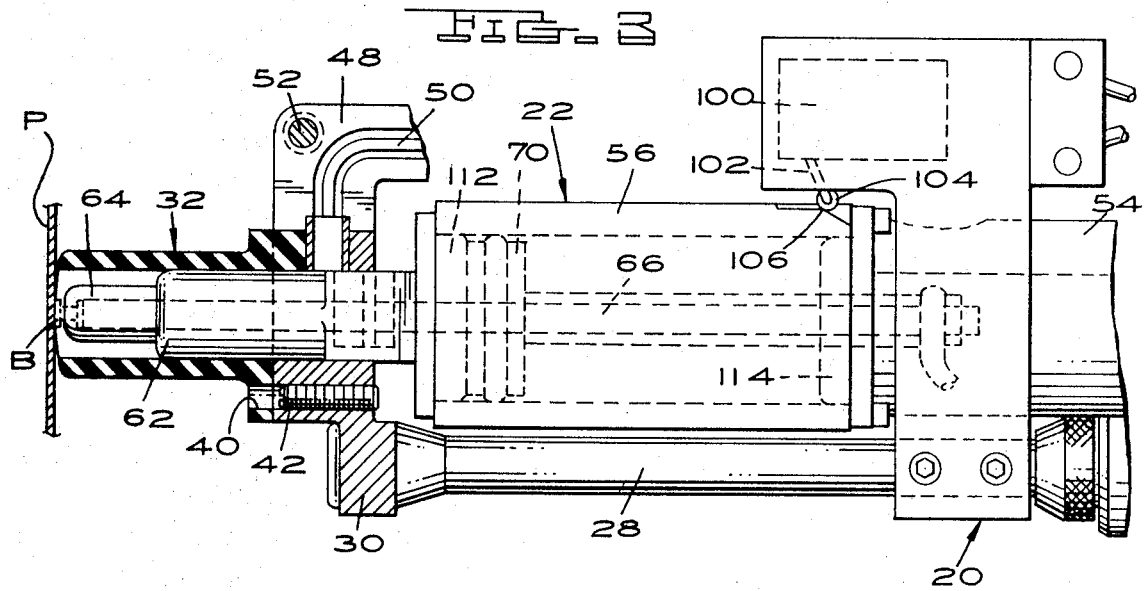
FIG. 3 is a side elevation, partly in section, of the gun mechanism showing the position and relationship of the parts during welding.

In general there is shown in FIGS. 1 through 8 of the drawings what may be referred to as a welding gun in the generic sense including a support 20 and an electrode assembly 22, which gun is adapted to weld buttons B to a panel P (FIG. 3).

At the rear end of the support 20 there may be provided a pistol grip type handle shown partially at 24, the upper portion of which includes a housing 26 within which is enclosed certain standard components well known in the art. Such comprise no part of the instant invention and are therefore not shown in the drawings. If the so-called stored arc welding process is used to weld the buttons to a panel, these components include an electrical solenoid with an armature coupled to the button-holding member on the gun to provide the "lift" during the welding cycle. If resistance welding is employed, the solenoid is eliminated, as no "lift" is required. It will become apparent to those skilled in the art as the specification proceeds that the subject matter of the invention may be utilized with any of the known types of welding methods.

Figure 4:
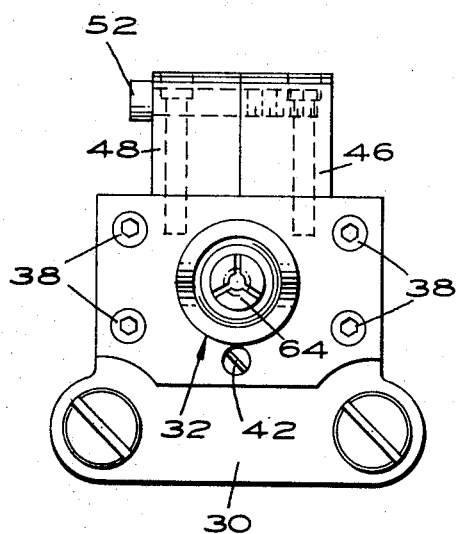
FIG. 4 is a front elevation of the gun shown in FIGS. 1—3.
Figure 5:
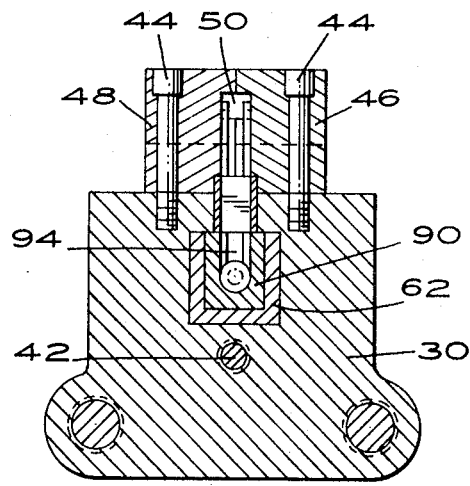
FIG. 5 is a cross-sectional view taken along line 5-5 of FIG. 2.

Projecting forwardly from the handle 24 are a pair of elongate members 28 comprising a portion of the support 20, upon the forward end of which is mounted an upstanding block 30. Secured to the forward face of block 30 is an insulative member 32 which may be properly termed both a panel locator and an arc shield, comprising a base portion 34 and a hollow sleeve 36. Member 32 may be mounted on block 30 by means of capscrews or the like 38 as shown in FIG. 4. Block 30 and member 32 have aligned internally threaded apertures therethrough 40 within which is threaded an adjusting screw 42 described in more detail hereinafter.

Mounted atop block 30 and secured thereto as by capscrews 44 (see FIGS. 4 and 5) are a pair of smaller blocks 46 and 48 arranged in face-to-face abutment and cut away to define a passage 50 through which buttons are delivered to the gun. The blocks are held in face-to-face abutment by a capscrew 52. Preferably the blocks 46 and 48 are machined to conform to and closely fit the configuration of the buttons to be delivered, as will more fully appear as the specification proceeds.

The electrode assembly 22 is mounted for limited reciprocable movement on the support 20 and includes coaxially aligned members 54 and 56 secured together as by screws 58, the rear member 54 being a hollow shell open at the bottom to accommodate an electrical cable 60, and the forward member 56 comprising a fluid pressure cylinder. Projecting forwardly from member 56 and preferably integral therewith is a tubular electrode member 62 having a forward end portion defining a button-holding chuck or collet 64. The chuck 64 may be a longitudinally split sleeve forming three resilient fingers as shown in front elevation in FIG. 4, cooperating to hold a button in position to be welded. Disposed for reciprocation within electrode member 62 is a rodlike electrode element 66 which extends completely through cylinder 56 projecting out the rear end thereof and connected at its rear end to the electric cable 60 as by a nut 68.

A fluid pressure piston 70 in cylinder 56 provided with a surrounding sealing ring 72 has a rearwardly extending sleeve 74 encircling rod 66. With nut 68 threaded on the rod entrapping cable 60 against the end of sleeve 74, rod 66 is rigidly connected to piston 70 for conjoint movement, and a current-conducting connection is established between the cable and the rod electrode, which is of course electrically conductive. Cylinder 56 is provided with fluid-conducting passages 76 and 78 opening into opposite ends of the cylinder respectively. Fluid under pressure is delivered to the passages 76 and 78 through conduits 80 and 82 connected thereto through suitable fitting 84. The conduits are coupled to a source of fluid under pressure (not shown), and fluid supply to the cylinder 56 is controlled by a solenoid operated valve schematically shown in FIG. 10, described in greater detail hereinafter.

Adjacent its rear end tubular electrode member 62 is provided with an upwardly opening cavity 86 within which are disposed a pair of guide blocks 88 and 90 shown in enlarged perspective in FIGS. 7 and 8. The blocks are wedgingly received in the cavity 86 in face-to-face abutting relation, and are axially bored as at 92 to accommodate a button B and the electrode element 66. As can be seen from FIGS. 6, 7 and 8, the blocks 88 and 90 are machined to provide a passageway 94 opening into bore 92, which passageway 94 conforms to the configuration of button B with the walls of the passageway closely embracing the button to ensure proper orientation thereof within the bore 92 for subsequent delivery by rod electrode element 66 to the holding chuck 64. In FIGS. 1—8 inclusive, the button B is shown as being generally H-shaped, and the passageway 94 is of like configuration. FIG. 9 shows schematically the arrangement for delivery of a T-shaped button B'. For delivering such a button, the delivery passageway 94' correspondingly is of T configuration to closely embrace the button B' and guide it in its movement into the bore for engagement by electrode 66.

Fixedly mounted on the support 20 as by securement to one of the members 29 through screws 96 is an upwardly extending arm 98 carrying switch means 100, in this case a microswitch. The switch 100 is actuated by means of an actuating arm 102 projecting therefrom and having a roller 104 at its outer end. Roller 104 normally rests upon the forward end of member 54, in which position the switch contacts remain open. However, as the electrode assembly 22 is shifted rearwardly with respect to the support 20 to its position shown in FIG. 3, roller 104 engages a projection 106 provided on cylinder 56, shifting actuating arm 102 to close the contacts of switch 100. As will become clear from the description following, switch 100 will be actuated to energize the welding circuit only if a button B is properly positioned in the holding chuck 64 when the forward end of the gun is forced against the panel P. In the absence of a button B in proper position for welding, the amount of relative movement between support 20 and electrode assembly 22 will be insufficient to actuate switch 100.

As shown in FIGS. 1 and 2, member 54 has a rear most end portion 108 guidably received in housing 26, with a coil spring 110 in the housing bearing against member 54 urging the electrode assembly 22 to a normally forwardly projecting position. The electrode assembly is yieldably shiftable against the tension of spring 110 with respect to the support 20 to the position shown in FIG. 3, at which switch 100 is actuated to effect welding of the button B to panel P.

To describe the operation of the welding gun, we assume that a button B has been delivered through tubular electrode 62 to the button-holding chuck 64, with the rodlike electrode element 66 engaging the button, as shown best in FIG. 2. Fluid under pressure is being supplied through conduit 82 and passage 78 to urge piston 70 forwardly in cylinder 56 against the forward end wall 112 thereof, which serves as a positive stop for the piston and hence positively determines the limit of stroke of electrode 66. The entire electrode assembly 22 is biased forwardly by spring 110 so that the button B projects a predetermined distance beyond shield 36, which distance may be conveniently set by position of screw 42 which the electrode assembly abuts in forward position.

Assuming all phases of the control circuit are operative, when the button B is brought against a panel P, and the gun urged toward the panel, relative movement occurs between the electrode assembly 22 and the support 20 until the shield 32 abuts the panel P as shown in FIG. 3. In this position, the projection 106 has struck switch roller 104, moving switch arm 102 to actuate switch 100 as the forward extremity of shield 32 abuts the panel P. Actuation of switch 100 energizes the control circuit shown schematically in FIG. 10, and the operation continues automatically.

The actual welding circuit for effecting current supply to the button B to be welded is shown partially in the upper portion of FIG. 10, and includes a transformer 120 for stepping the line voltage down to a suitable value, say 32 volts a diode rectifier 122, a control relay CR–1 and a condenser 124 connected in parallel with relay CR–1. Such are well-known components in the electric welding art and need not be described in further detail, except to point out that as the welding circuit is completed by the closure of relay contacts CR–3a as described below, welding current is passed through button B and panel P to weld the two together.

Referring to the remaining portion of FIG. 10, there is shown a control circuit supplied with 110 volts alternating current from a suitable source (not shown). With the parts of the circuit as shown in FIG. 10, the gun is as shown in FIGS. 1 and 2, i.e., conduit 82 is pressurized forcing piston 70 and electrode 66 forwardly engaging button B releasably held in holding chuck 64, and switch contacts 100 are open. When the welding gun is shifted toward the panel P, button B first abuts the panel, interruption movement of the electrode assembly 22 theretoward, and support 20 moves forwardly against the force of spring 110 until the forward extremity of shield 32 abuts the panel. At this point the relationship between support 20 and electrode assembly is as shown in FIG. 3, and contact of roller 104 against projection 106 closes switch 100.

Closure of switch contacts 100, as shown in FIG. 10, immediately energizes relay CR–3, thereby closing relay contacts CR–3a, CR–3b and CR–3c. Closure of CR–3a completes the welding circuit, and therefore welding current is supplied to button B immediately upon actuation of switch 100. Closure of CR–3b energizes relay CR–2, opening contacts CR–2a and closing contacts CR–2b. Relay CR–2 is thus locked in by CR–2b while relay CR–3 is deenergized by opening of CR–2a. As CR–cannot be reenergized through CR–2a until CR–2 is deenergized, and CR–2 is only deenergized by the opening of 100, the welding circuit cannot be reinitiated unless the gun is pulled away from the panel P to allow electrode assembly 22 to shift forward with respect to support 20, opening switch 100. Thus, the provision of relays CR–2 and CR–2 in the control circuit positively prevents double welding of a button, as the gun must be retracted from the panel to open switch 100 before the welding circuit can be reenergized.

Energization of relay CR–3 closes contacts CR–3c, which energizes time delay relays TD–1 and TD–2. Relay contacts TD–1a are closed instantaneously, the locking in the time delay relays. At the expiration of the time period of TD–1, its contacts TD–1b closes, energizing solenoid S to shift the fluid pressure valve (not shown) controlling the flow of fluid pressure to cylinder 56. Closure of TD–1b also energizes relay CR–4, which includes a set of contacts in the button-delivery system closure of which contacts causes a button to be delivered through delivery conduit 116 passages 50 and 94 to the tubular electrode. Reversal of the valve exhausts line 82 and pressurizes line 84 (see FIG. 2) supplying fluid pressure through passage 76 to the front face of piston 70, moving the piston rearwardly against the positive stop comprising cylinder end wall 114, as shown in dotted outline at 70' in FIG. 2. Electrode rod element 66 shifts with the piston, and in its rearmost position the front extremity of the rod lies in alignment with rear wall of button passage 94, forming a continuation of such wall so that upon delivery of a button there is no possibility of the button becoming misaligned in the tubular electrode 62.

Upon the energization of solenoid S to retract piston 70 and rod 66, the button-delivery system coupled to passageway 50 through conduit 116, is actuated by energization of relay CR–4 to deliver another button to the tubular electrode 62 forwardly of electrode rod 66. After a predetermined time interval sufficient to ensure button delivery to electrode 62, the time period of relay TD–2 expires, opening normally closed contacts TD–2a, deenergizing relay TD–1, opening contacts TD–1b, and thus deenergizing solenoid S. When the solenoid is deenergized, the fluid pressure control valve (not shown) shifts to its position pressurizing line 82 to shift piston 70 and electrode 66 forwardly, with the electrode carrying the button just delivered through tubular electrode 62 to its position in holding chuck 64 as shown in FIGS. 1 and 2. Even if the gun has not been retracted from panel P, i.e., has been held against the panel during the entire operation, the welding circuit cannot be energized to cause welding current to flow through cable 60 and electrode 66 to the button because of the provision of the safety interlock comprising relays CR–3 and CR–2 described above.

Referring now to FIG. 1, it can be seen how switch 100, in addition to actuating the circuit, is provided as shown for safety purposes, positively preventing the welding cycle from being initiated unless a button is properly positioned in the chuck 64 to be welded. In order to actuate switch 100, sufficient relative motion must occur between projection 106 and switch roller 104 to shift actuating arm 102, and this relative movement is accomplished by forcing the gun against a panel. Thus, when the shield 32 abuts panel P, the electrode assembly 22 must have shifted a predetermined distance relative to support 20 and the switch 100 to actuate the arm 104. As button B projects beyond the end of electrode assembly 22, if no button is present, the relative shiftable movement will be insufficient to actuate switch 100, and the circuit will not be energized.

As piston 70 and electrode rod 66 come up against a positive stop defined by end wall 112 of cylinder 56, button B is positioned exactly with respect to the electrode assembly. In addition, screw 42 serves as a positive stop determining the exact position of the electrode assembly 22 with respect to the support 20. Thus, the exact relative positions of all the parts of the gun are positively located to ensure proper operation of the gun. Stop screw 42 also makes it possible to exactly align the passageway 94 in electrode 62 with the delivery passage 50 in members 46 and 48 to ensure proper button delivery to the electrode, as can be most clearly seen in FIG. 2.

Referring now to FIGS. 11–21 of the drawings, the first particularly to FIG. 11, there is shown a complete system for welding small studs or as they may be called, buttons, to metal panels. While developed specifically for welding fastener components to automobile bodies, it will be apparent as the specifications proceeds that the system is adaptable to many other applications. Essentially the system comprises three distinct parts, i.e., the welding gun unit 220, the feed mechanism 222, and a control unit 224. The welding gun 220 is suspended by means of a cable 226 from a takeup reel 228 hung in a convenient location. The feed mechanism 222 is preferably suspended overhead to keep the floor area clear, and a trolley 230 riding along a track 232 may be provided, and the feed mechanism suspended from the trolley by a hanger member 234. The control unit 224 is preferably enclosed in a suitable cabinet as shown and may be positioned in an out of the way location on the floor. Interconnecting the feed unit 222 and the gun 220 is a conduit 236 through which the studs to be welded are delivered one at a time to the gun. The control unit 224 is connected to a suitable source of electrically (not shown), and a cable 238 delivers electric current to the feed mechanism 222, which is also connected to a source of fluid under pressure (not shown). Both pressure fluid and electric welding current are furnished to the welding gun 220 from the feed mechanism 222 through lines collectively indicated at 240 in FIG. 11.

The feed mechanism (FIG. 12) includes a platform 242 to which are connected frame members, two of which are shown at 244 and 246 converging at their upper ends for connection to a cross member 248 (FIG. 11), in turn connected to hanger 234. Positioned on platform 242 is a vibratory hopper assembly comprising a support 248 having leaf spring assemblies 250 upstanding therefrom which carry a hopper 252 having brackets 254 projecting from its periphery near the upper end and support rods 256 upstanding from platform 242 and secured to the brackets 254 as by nuts 258. Vibration is imparted to the hopper by suitable motive means (not shown). The construction of the vibratory hopper itself is well known in the art and need not be further described.

The lower end wall 260 of the hopper 252 is provided with a helical ramp, and the studs are vibratorily conveyed up the ramp upon vibration of the hopper. The terminal end of the ramp is indicated at 262 in FIG. 13. A button guide means comprising a lower truck member 264 and an upper guide member 266 is mounted at the terminal end of the ramp 264 to properly orient the buttons H as they are vibratorily conveyed from the hopper. Track 264 is secured to the hopper as by screws 268 and defines an upwardly projecting rib 270 which is interposed between the legs of the buttons H. Guide member 266 defines a similar rib 272 oppositely disposed, and is secured to a vertical platelike member 274 as by screw 276. Track 264 is connected to the vibrating hopper, and vibrates therewith to convey the buttons H up its inclined surface. Guide 266 is spaced from these vibrating parts, and is provided to ensure that the buttons do not get dislodged from the track or become misaligned thereon.

Secured to plate 274 as by screws or the like (not shown) is a block 278 having a vertically extending cutout 280 therein adapted to closely embrace the buttons H (FIG. 15). The cutout 280 communicates with the end of the track 264 and buttons delivered along the track fall off the end thereof and are stacked within the passage 280. Members 276 and 278 are provided with longitudinally extending discontinuous cutouts 282 (FIGS. 12 and 15) opening into passage 280 for purposes to be described hereinafter.

A plate 284 is secured to the base 242 of the hopper assembly (FIG. 12 ) as by screws 286, and mounted on the plate 284 is a manifold block 288 having a horizontally disposed button feed passage 290 and a vertical passage 292 (FIG. 13). Also secured to plate 284 is a double-acting cylinder 296 having a piston 298 with a piston rod 300 projecting therefrom and axially into the passage 290. The piston rod 300 and passage 290 are rectangular in cross section, and the piston rod exhibits a button-receiving aperture 302 therethrough, which in plan view is shaped corresponding to the shape of the buttons H (FIG. 16). In its fully retracted position the piston rod 300 is disposed with the aperture 302 aligned beneath passage 280 so that the lowermost button in the stack drops into passage 290 and is embraced in the piston rod. In its extended position, the aperture 302 is aligned with vertical passage 292.

Connected to the upper end 304 of passage 292 is a fluid pressure supply lie 306 which delivers pressure fluid, preferably air, to the vertical passage, as described more fully herebelow. Fixed to the underside of block 288 as by screws 308 is a tubular collar 310 within which is secured the button delivery conduit 236, in turn coupled at its opposite end to welding gun 220 (FIG. 11). The conduit 236 comprises a flexible tube having a button feed passage 312 shaped correspondingly to the shape of the buttons H to be delivered through the conduit (FIG. 17). The passage 312 is slightly oversize the buttons to be passed therethrough, but its dimensions are sufficiently close to the button dimensions so that there is no possibility of the buttons becoming "cocked" or "-hung up" in the tube. The conduit 236 is preferably constructed of of plastic material, and the passage walls are smooth and free from irregularities that could interfere with the travel of buttons therethrough. Materials such as nylon, polypropylene and polyethylene have been tested and found satisfactory for conduit 236. However, polyurethane has been found to offer the best characteristics of the materials tried, and is presently in use.

Referring to FIG. 13, cylinder 296 has fluid pressure lines 314 and 316 coupled to opposite ends thereof, and pressurization to line 316 shifts piston 298 and piston rod 300 forwardly, carrying a button H in the rod. At the outer extremity of piston travel, piston rod 300 is disposed with its aperture 302 aligned over passage 292, and when the rod reaches this position, pressure fluid is delivered through line 306 and passage 304 to blow the button through tube 236 to the welding gun 220. As shown most clearly in FIG. 16, the upper rear edges of aperture 302 are chamfered as at 318 to ensure that the next button in the stack does not catch on the edge of the aperture as the piston rod shifts to transfer a button. The sequential operation of the entire system will be described hereinafter.

FIGS. 18, 19 and 20 show modifications made to adapt the system for handling T-shaped buttons shown at T in such FIGS. In FIG. 18 there is shown a view similar to FIG. 15 of the structure for stacking the buttons, comprising a block member 320 provided with a rectangular cutout 322 accommodating the head of the button T, and two spaced plates 324 and 326 secured to the block 320 in end-to-end spaced relation as by screws 328 and dowels 330 with the leg of the button guidably disposed between the plates.

FIG. 19 shows the forward end of a piston rod 332 similar to the rod 300 previously described, but having an aperture 354 shaped to accommodate the T-shaped button indicated at T. The aperture 334 is chamfered as at 336 similarly to the rod 300 as described above. FIG. 20 shows a delivery conduit 236' having a passage 312' therein for feeding A T-shaped button, and the conduit 236' otherwise is closely identical to conduit 236 as shown in FIG. 17.

OPERATION

Figure 21:
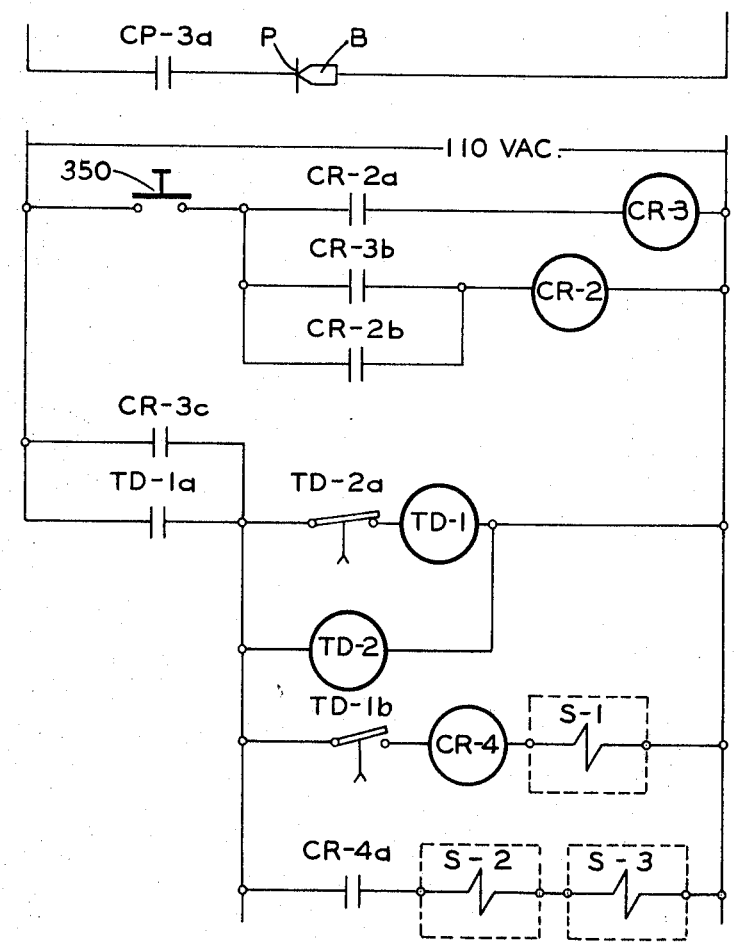
FIG. 21 is a schematic diagram of the electrical control circuit for the system.

There is shown in FIG. 21 a schematic wiring diagram of the electrical control circuit for the system shown in the drawings. Some portions of the control have been previously described above, and a detailed description of those portions of the circuit will not be undertaken here. As the actual welding circuit for effecting current supply to the welding gun 220 does not form a part of the instant invention, such has not been shown in FIG. 21. It is to be understood, however, that within the control cabinet 224 shown in FIG. 11 there is provided a welding circuit for delivering welding current to the gun 220. For the purposes of explanation of the instant invention, there is shown at the top of FIG. 21, a portion of the welding circuit, comprising normally open relay contacts CR–3a, a panel member P and a button B. Closure of contacts CR–3a allows welding current to pass through the parts P and B to effect the welding of the button B to the panel P. The designation B has been used for the button in FIG. 21 to distinguish from the buttons H and T shown in the other FIGS. of the drawings, because it is immaterial what the exact configuration of the button is, and the button B could be of some other type for the purposes of the following description.

Referring to the remaining portion of FIG. 21, there is shown a control circuit supplied with 110 volt alternating current from a suitable source (not shown.) Such circuit includes a suitable switch means 350, which may be of the type indicated at 300 in FIG. 10, or it may be a switch which is actuated by a trigger-type actuator as indicated by the numeral 352 in FIG. 11 of the drawings. In either case, it can be seen form FIG. 21, that closure of switch 350 energizes relay CR–3 thereby closing relay contacts CR-a CR-3b and CR-3c. Closure of these contacts serves respectively to initiate the welding cycle, to energize control relay CR-2, and to energize the time delay relays TD-1 and TD-2. Energization of CR-2 opens normally closed contact CR-2a, dropping out relay CR-3 and opening its associated contacts to interrupt the supply of welding current to the members P and B. However, deenergization of CR-3 does not affect the operation of the time delay relays or CR-2, as such have been "locked in" by the contacts CR-2b and TD-1a shown in FIG. 21.

At the expiration of the time period of relay TD-1, its associated contacts TD-1b close, energizing relay CR-4 and also a solenoid S-1 to shift a fluid pressure valve (not shown) associated with the solenoid to cause the fluid pressure operated mechanism on the welding gun 220 to retract the plunger to a position for accepting a successive button B to be welded to the panel P. Thus upon the actuation of solenoid S-1, the welding gun plunger retracts to accept another button, and as this retraction is substantially instantaneous, the gun is in a condition to receive the next following button upon the institution of the button feed mechanism as described herebelow.

Energization of relay CR-4 closes relay contact CR-4a actuating solenoids S-2 and S-3, each of which are connected to a fluid pressure operated valve which is shifted upon energization of the solenoid. Solenoid S-2 and its associated valve control the supply of fluid pressure through lines 314 and 316 to cylinder 296 (FIG. 13). With solenoid S-2 deenergized, fluid pressure is supplied through line 314 urging the piston 298 to the rear end of cylinder 296, whereby the piston rod 300 is in its normally retracted position shown in FIG. 13 in register with button passage 280. When solenoid S-2 is energized, the valve shifts, exhausting line 314 and pressurizing line 316 to shift the piston 298 and piston rod 300 forwardly, delivering the button positioned in the piston into register with conduit passage 292. Similarly, energization to solenoid S-3 shifts its associated valve to supply fluid under pressure through line 306 to passage 304 to urge the button through passage 292 into tube 236, and deliver the button under pressure to the welding gun 220. Time delay relay TD-2 is set with a time delay period sufficient to ensure that the button has been delivered to the gun, and at the expiration of TD-2, its associated contacts TD-2a, which are normally closed, are opened, deenergizing TD-1 and opening contacts TD-1b to deenergize the solenoids S-1, S-2 and S-3 and return all of the components of the system to their original position.

Figure 12:
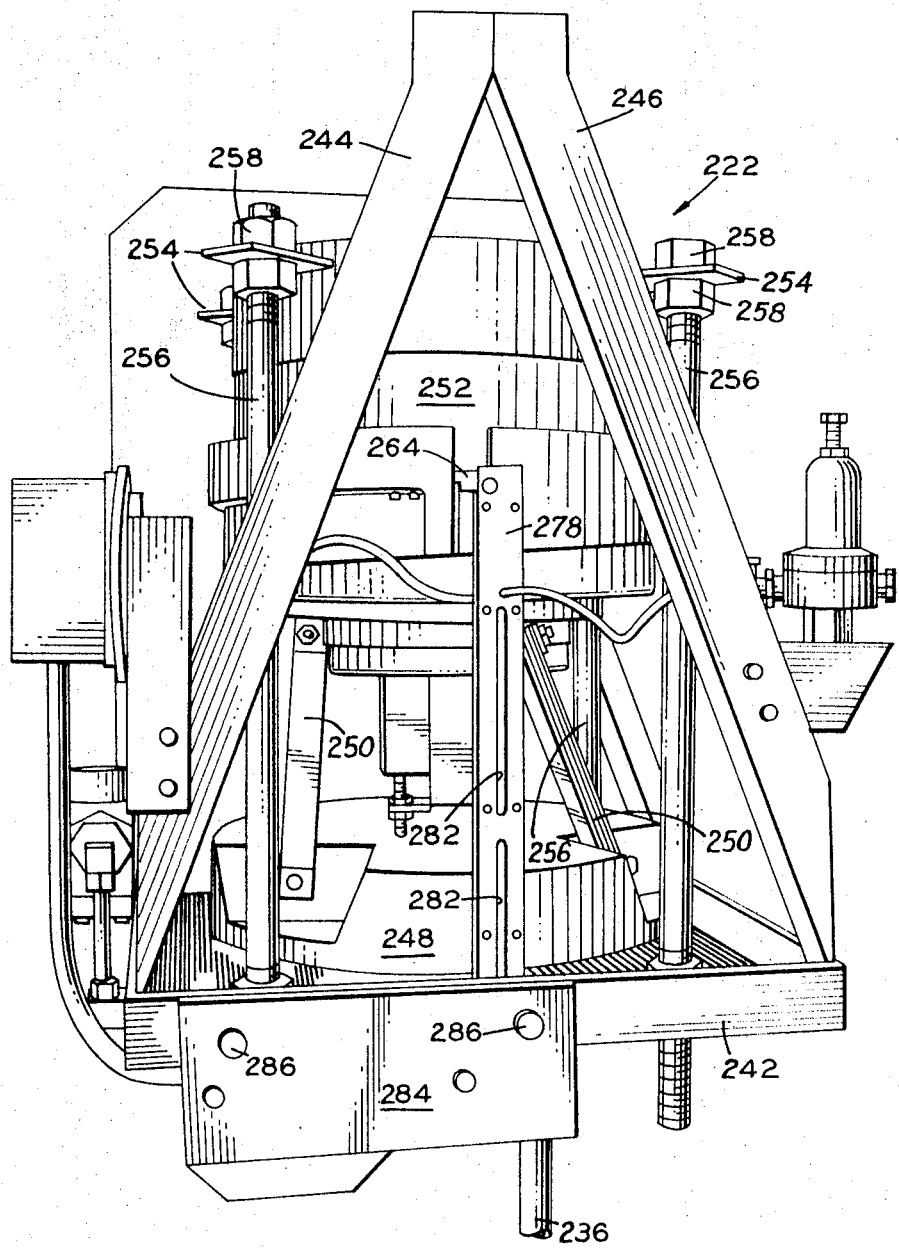
FIG. 12 is a perspective view on a larger scale than FIG. 11 showing the fastener element storage and feed mechanism of the system.

As set forth hereinabove, the passage 280 within which the button are stacked is provided with discontinuous cutouts therealong, as shown in FIGS. 12 and 15. Some of the supply air from passage 306 may bypass piston 300 in passage 290 and be diverted into passage 280, tending to urge the stack of buttons H upwardly therein. The cutouts 282 provide exhaust for this air to prevent the buttons from being suspended on air in the passage 280.

Referring to FIG. 18, it can be seen that the spaced-apart condition of members 324 and 326 keeps passage 322 open to the atmosphere for the same purpose.

What we claim is:

1. An automatic, portable-gun system for repetitively welding relatively small components to panel surfaces, comprising, in combination: storage means for containing a supply of components to be welded; pneumatic feeding means for receiving components from the storage means and propelling one component at a time to the gun; a portable welding gun operable remote from and manipulatable to various welding positions independently of said storage means and said feeding means and having collet means for positioning and holding a component in welding position; a flexible elongate pneumatic delivery conduit connected at its opposite ends to said feeding means and said welding gun for delivering components therebetween; means on the gun communicating with said delivery conduit for receiving and transferring each component delivered to the gun into said welding position in the collet; a source of welding current connected to the gun; and control means connected to said feeding means and to said source of welding current and including a part on the gun operable to initiate automatic cycling operation of the system to cause welding of a component in the collet to a panel surface and delivery of the next component to the collet preparatory to the next welding cycle.

2. The invention as defined in claim 1 characterized in that said storage means includes a hopper for containing randomly oriented headed button components and also includes means for receiving said components and arranging them in predetermined uniform orientation and delivering them to said feeding means.

3. The invention as defined in claim 1 characterized in that said system is adapted to end-weld buttons having a shank and a head whose overall axial dimension and profile are such that they tend to tumble if fed axially through a feed tube, and said elongate conduit comprises a flexible plastic tube, having a smooth bore shaped in cross section to conform to the profile of the buttons and sized to embracingly support the shank and head of each button for transfer of the button through the tube in a direction substantially perpendicular to the shank of the button.

4. The invention as defined in claim 3 characterized in that the bore of the tube is H-shaped in cross section.

5. The invention as defined in claim 3 characterized in that the bore of the tube is T-shaped in cross section.

6. An automatic electric welding gun system for end welding buttons to a panel in rapid succession comprising, in combination: a portable, hand manipulatable gun, said gun including an electrode assembly for holding successive buttons in a welding position at the forward end of the gun: means on the gun defining a button receiving inlet disposed rearwardly of said welding position for receiving successive buttons delivered to the gun; said electrode assembly having a part shiftable relative to said inlet for transferring each button received at the inlet forwardly to and holding it at said welding position; fluid pressure operated motive means on the gun connected to said electrode part for shifting the same as aforesaid; first flexible fluid passage means for supplying fluid to said motive means; first valve means for controlling the flow of fluid through said first fluid passage means to the motive means; flexible button feed passage means for feeding buttons to said inlet; fluid operated means connected to said button feed passage means for feeding buttons one at a time to said passage and blowing them through the passage to said inlet; additional passage means for supplying fluid to said fluid operated means; a stationary hopper remote from said welding gun; means for directing buttons sequentially to said fluid operated means from said hopper; second valve means for controlling flow of fluid through said additional passage means; and control means electrically associated with a welding circuit for the welding gun, said control means connected to both of said valve means to actuate them in timed sequence for first causing said fluid operated means to blow a single button through the passage means to said inlet and also causing said electrode part to shift to allow entry of a button through the inlet, and thereafter causing said fluid operated means to be inoperative while causing said electrode part to shift positioning the button in the aforesaid welding position.